Dec. 29, 1936.    P. LANDROCK    2,065,939
FEEDING AND MEASURING APPARATUS
Filed Jan. 6, 1936    4 Sheets-Sheet 2

INVENTOR
Paul Landrock
BY Edward H Cumpston
his ATTORNEY

Dec. 29, 1936.  P. LANDROCK  2,065,939
FEEDING AND MEASURING APPARATUS
Filed Jan. 6, 1936  4 Sheets-Sheet 4

INVENTOR
Paul Landrock
BY Edward H. Cumpston
his ATTORNEY

Patented Dec. 29, 1936

2,065,939

UNITED STATES PATENT OFFICE 2,065,939

FEEDING AND MEASURING APPARATUS

Paul Landrock, Rochester, N. Y., assignor to Photostat Corporation, Providence, R. I., a corporation of Rhode Island Application January 6, 1936, Serial No. 57,804

10 Claims. (Cl. 271—2.4)

The present invention relates to apparatus for feeding measured lengths of material such, for example, as sheets or webs of photographic paper or film. While the mechanism herein disclosed is particularly suitable and adapted for feeding sensitized sheet material in a photographic camera, it is by no means confined to this use, and it must be understood that the invention may be applied, with little or no modification, to the feeding of other materials in other locations or surroundings.

One object of the present invention is the provision of generally improved and more satisfactory apparatus for feeding measured lengths of material.

Another object is the provision of apparatus which will measure the lengths of material more accurately and with greater precision than prior apparatus.

Still another object is the provision of apparatus which may be adjusted to feed any desired length of material within the maximum and minimum limits of the apparatus, without limitation to a few selected lengths of material, as has been necessary in prior forms of apparatus.

A further object is the provision of apparatus of simple and sturdy construction, inexpensive to build, and "foolproof" in operation.

To these and other ends the invention resides in certain improvements and combinations of parts, all as will be hereinafter more fully described, the novel features being pointed out in the claims at the end of the specification.

In the drawings.

The same reference numerals throughout the several views indicate the same parts.

Figure 1:
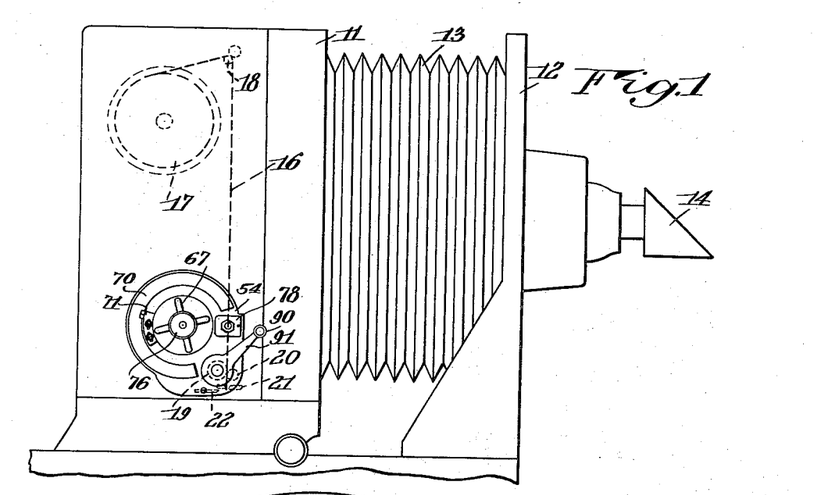
Fig. 1 is a diagrammatic side elevation of a photographic camera showing applied thereto a preferred form of the present invention.
Figure 6:
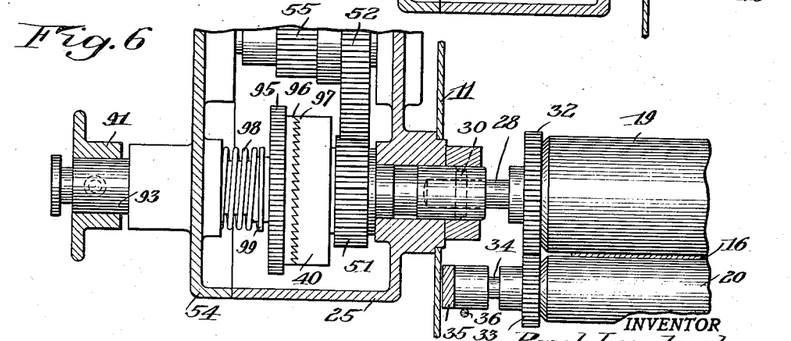
Fig. 6 is a section taken substantially on the line 6—6 of Fig. 2.

Referring now to Fig. 1 of the drawings, there is illustrated a known form of photocopying machine or commercial camera, equipped with the feeding and measuring apparatus of the present invention. The camera comprises a back 11 and a front 12 mounted for movement relative to each other for focusing and connected to each other by a bellows 13. The front 12 carries a suitable lens system and a prism 14 for bending the light rays so that the camera may photograph objects laid on a substantially horizontal copyholder. The images of such objects are formed at the focal plane of the camera, within the back 11, in which focal plane lies an expanse 16 of sensitized sheet material or film (preferably sensitized paper) drawn from a supply roll 17 over a guide roller 18 and downwardly through the focal plane, as shown. Just below the lower edge of the focal plane, the web or sheet 16 is gripped by feed rollers 19 and 20 (Figs. 1 and 6) which, by their rotation, pull the exposed area of the web 16 downwardly out of the focal plane and bring a fresh unexposed area into the focal plane after each exposure. Below the feed rollers 19 and 20 is suitable cutting means such as the pair of knife blades 21 and 22 which are moved by suitable mechanism to cooperate with each other and cut off the exposed portion of the web of sensitized material, so that this exposed portion may be suitably treated, as by developing and fixing it, without waiting for the whole roll of sensitized material to be used up.

At different times it is desired to make photographic reproductions upon different areas of the focal plane. For example, when making the largest sized reproduction within the capacity of the camera, the entire area of the focal plane may be exposed. When a smaller reproduction is to be made, one-half or one-fourth of the focal plane area may be exposed, the rest being left unexposed, as by placing an opaque screen in front of the part which is not to be exposed, or by the use of other suitable means.

It is desired, after each exposure, to feed an accurately measured length of sheet material, in order that the entire exposed part of the material may be brought down to a position below the knives 21 and 22 to be cut off, and in order that, at the same time, only the required amount may be fed, without feeding an excess amount which would be wasteful of the expensive sheet material. Hence it is desirable to provide feeding and measuring apparatus which will measure the material more accurately than has been possible with prior apparatus and which is capable of a finer adjustment than has heretofore been possible.

The preferred embodiment of such measuring and feeding apparatus will now be described with reference to the other figures of the drawings.

Suitably secured to one side of the casing of the back portion 11 of the camera, is a casing portion 25 for the measuring and feeding apparatus. Within this portion 25 and extending substantially perpendicular to the side wall of the camera casing 11, is a rotatable shaft 26 (Figs. 3 and 5) having at its inner end a socket 27 for receiving the end of the shaft 28 on which the feed roller 19 is mounted, and having a slot 29 engaged by a pin 30 on the feed roller shaft, to connect the two shafts non-rotatably to each other when the parts are in normal assembled relationship. Rotation of the shaft 26 is, therefore, accompanied by equal rotation of the shaft 28 and of the feed roller 19. The rotation of the roller 19, which bears against one side of the paper 16, may be sufficient to cause proper feeding of the paper without positive driving of the other roller 20, but it is ordinarily preferred to drive both of the feed rollers to prevent any possibility of slipping of the web of sensitized material between them. This may be conveniently accomplished by means of a spur gear 32, fixed to the roller shaft 28 at one end of the roller 19, and meshing with another spur gear 33 (Fig. 6) fixed to the shaft 34 of the other feed roller 20.

The ends of the shaft 34 are journaled in hangers or links 35 pivoted to the inner surfaces of the side walls of the camera casing 11 and pressed by springs 36 in a direction toward the roller 19, so that the two rollers firmly grip the sensitized material between them.

For driving the shaft 26 to turn the feed rollers 19 and 20, there is provided a driving member 40 (Figs. 5 and 6) freely rotatable on the shaft 26 and connected to it by a one-way roller clutch so arranged that when the driving member 40 is rotated in one direction to any extent, the shaft 26 is correspondingly turned, but the driving member 40 may rotate freely in the opposite direction without any turning of the shaft. This one-way roller clutch may be of any known construction, such as that illustrated in Figs. 5 and 8, in which it is seen that the member 40 is developed into an annular rim or flange forming one part of the clutch. Within this is a hub 42 fixed to the shaft 26 in any suitable manner as by a pin 43. The periphery of this hub is so shaped as to provide a series of spaces 44 between the periphery of the hub 42 and inner surface of the annular flange of the member 40, each of these spaces being tapered in one direction as plainly shown in Fig. 8. Within each of these spaces is a hard metal roller 45 constantly pressed by a spring 46 from the larger end toward the smaller end of its tapered recess 44. A cover plate 47 held in place by screws 48 pressing into tapped openings 49 in the hub, holds the rollers 45 in place against axial displacement.

Figures 7, 8, 9:
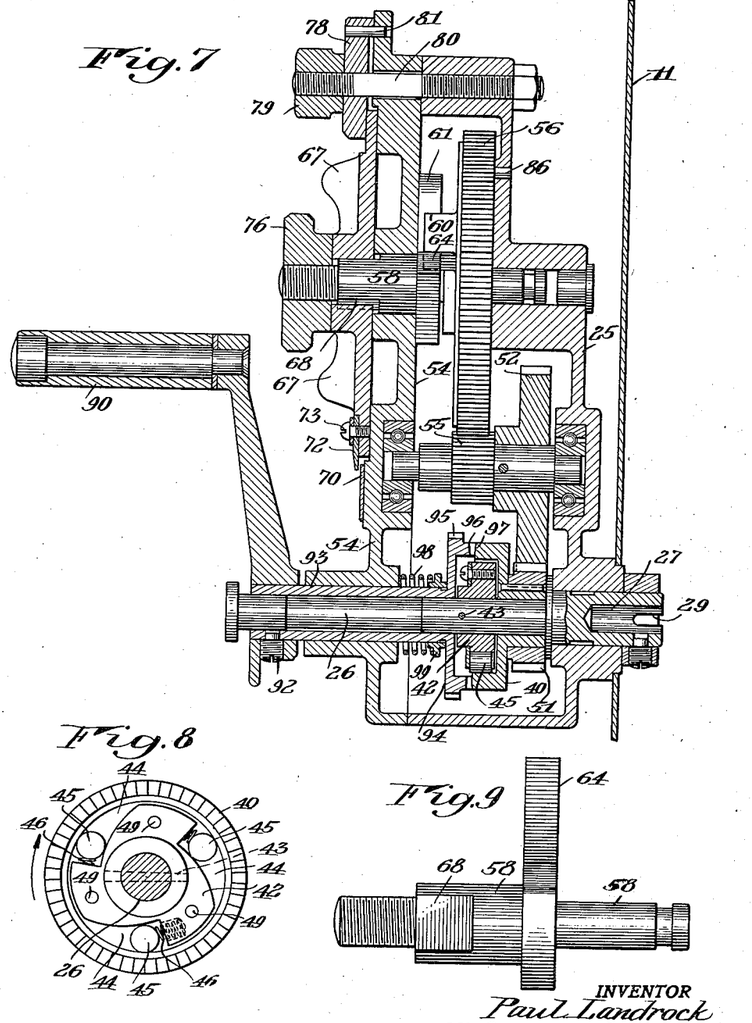
Fig. 7 is a view similar to Fig. 5, showing the parts in a different position.
Fig. 8 is a detail of certain clutch parts used in the apparatus.
Fig. 9 is a detail of the adjustable stop member for limiting movement of the metering member.

If, now, the driving member 40 be turned in a clockwise direction when viewed as in Fig. 8, the first increment of such motion relatively to the shaft 26 will tend to roll the clutch rollers 45 along their tapered spaces 44 toward the smaller ends thereof. Inasmuch as the springs 46 have already pressed these rollers as far as possible toward the smaller ends, it is obvious that no further movement of these rollers toward the smaller ends is possible. Hence, the rollers will bind in the tapered spaces between the driving member 40 and the clutch hub 42, and the rotation of the driving member 40 will be transmitted to the clutch hub 42 and though it to the shaft 26, which, in turn, will turn the feed rollers 19 and 20 by an amount exactly equivalent to the rotation of the driving member 40 in a clockwise direction.

On the other hand, when the driving member 40 is turned in an opposite or counter-clockwise direction, the hub 42 of the clutch need not turn with it. Counter-clockwise movement of the driving member 40 tends to roll the rollers 45 toward the larger ends of their tapered recesses 44, against the weak force of the springs 46, and thus releases the rollers from their tight gripping contact with both the members 40 and 42, permitting the member 40 to turn without any movement of the member 42.

In order to prevent any possibility of accidental counter-clockwise turning of the shafts 26 and 28 when the driving member 40 is moved in a counter-clockwise direction, the shaft 28 is preferably provided with another and similar one-way roller clutch, not shown, and preferably located at the opposite end of the shaft 28, from that which is connected to the shaft 26. The construction of this other clutch may be the same as that above described, the hub portion of the clutch being pinned or otherwise fixed to the shaft 28, and the annular rim or flange part of the clutch being fixed to a suitable stationary part, such as a wall of the camera casing 11, the parts being arranged so as to permit free rotation of the shaft 28 in a clockwise direction when viewed from the end shown in Figs. 5 and 6, and to prevent counter-clockwise rotation thereof.

The driving member 40 is operatively connected to a metering member which meters or measures the extent to which the driving member 40 may turn at each operation, and thus determines the length of sheet material which may be fed. Preferably the driving member 40 has fixed to it a gear 51 meshing with a gear 52 fixed to a shaft 53 journaled in ball bearings in the back casing member 25 and in the front or removable casing member or cover 54. This shaft 53 also carries, or has formed integrally with it, a pinion 55 meshing with gear teeth 56 on the periphery of the metering member 57, which is freely rotatable on a shaft 58 passing through the front wall or cover 54 of the casing and extending through the interior of the casing and being journaled in the rear wall thereof.

Figure 3:
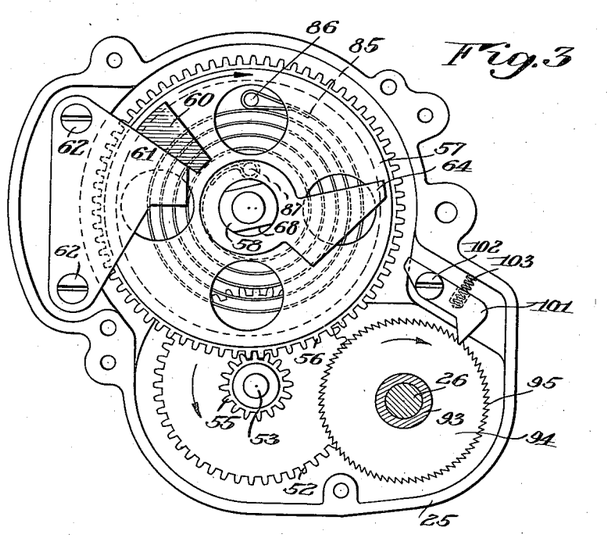
Fig. 3 is a view similar to Fig. 2, with a cover plate and other overlying parts removed to show the construction beneath.
Figure 4:
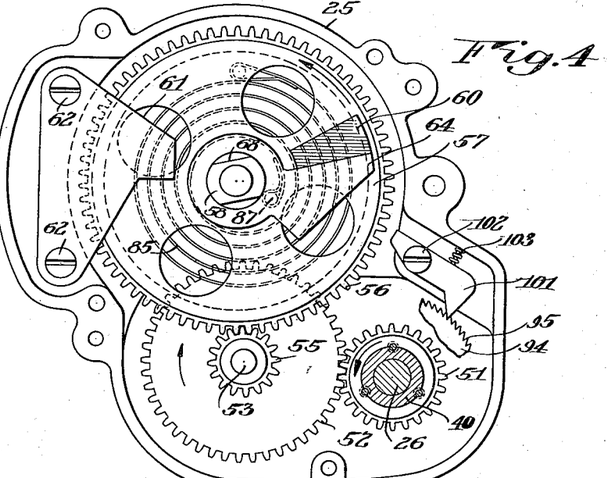
Fig. 4 is a view similar to Fig. 3, with the parts in a different position, and with additional parts removed to show additional details.
Figure 5:
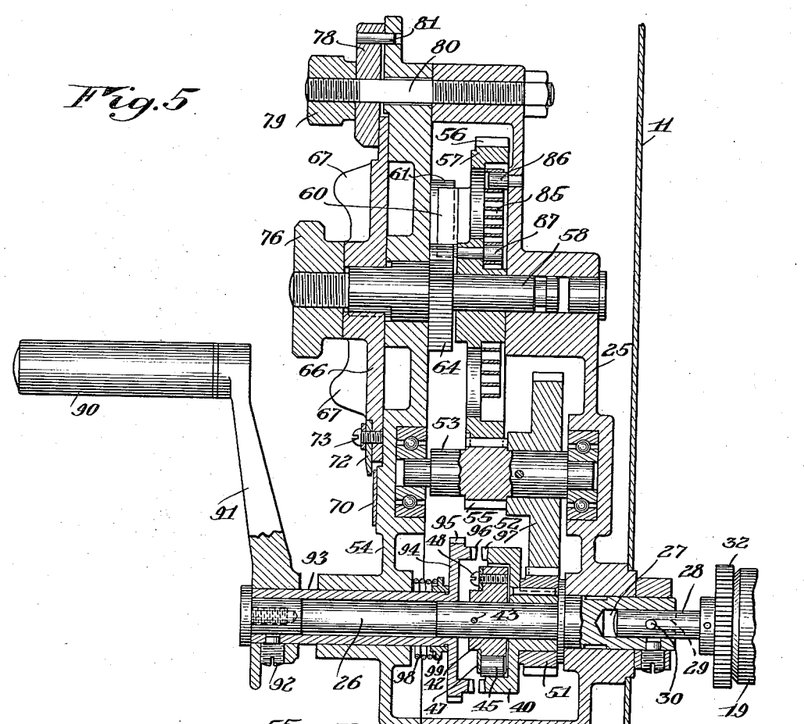
Fig. 5 is a transverse section taken substantially on the line 5—5 of Fig. 2.

This metering member 57 carries a projection or lug 60 which is in alinement with a fixed lug or abutment member 61 secured in the casing as by means of screws 62, so that the lug 60 on the metering member contacts with the stop 61, as shown in Figs. 3 and 5, to limit movement of the metering member 57 in one direction. The opposite end of the limited range of movement of the metering member 57 is defined by contact of the projection 60 with an adjustable stop or abutment member 64 formed as an arm fixed to the shaft 58, as best shown in Figs. 3, 4, and 9.

In order to turn the shaft 58 for the purpose of adjusting the position of the stop arm 64 and thus varying the extent of possible movement of the metering member 47, the outer end of the shaft 58 is non-rotatably connected to a face plate 66 which lies on the front of the casing cover 54 and which has upstanding lugs or projections 67 which may be conveniently grasped for the purpose of turning this face plate and the shaft 58 and arm 64. The connection between the face plate and shaft 58 may conveniently be made by providing substantial flat spots 68 (Fig. 9) on the shaft 58 where it passes through the plate 66, and making the opening in the plate 66 of a corresponding shape.

Figure 2:
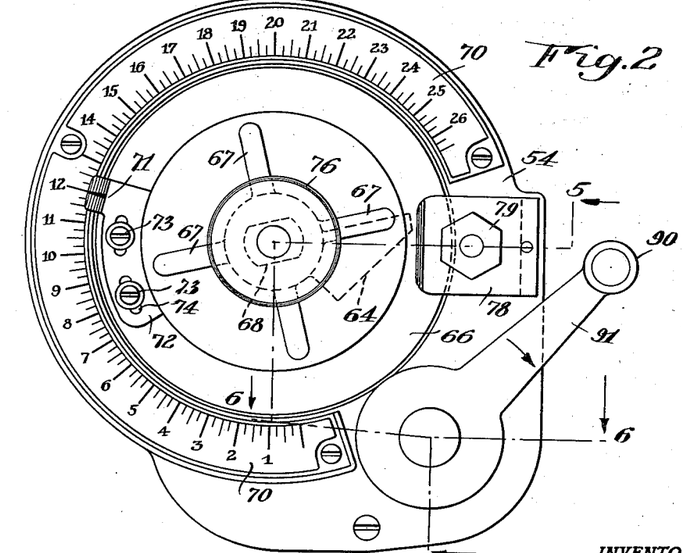
Fig. 2 is a side view, on a larger scale than Fig. 1, of the preferred form of measuring and feeding apparatus.

Cooperating scale means on the face plate 66 and on a fixed part of the casing (such as the cover 54) may be used for setting the adjustable stop 64 for feeding different lengths of material. This scale means, as shown in Fig. 2, may comprise a graduated scale 70 of arcuate form on the casing cover 54, to be read in connection with an index or pointer graduation 71 on a plate 72 fixed to the face plate 66, as by screws 73 passing through slots 74 in the plate 72 so that the index plate may be properly set in the exact position required when the apparatus is assembled. The scale 70 is preferably graduated to read directly in units of lengths of material to be fed at each operation of the feeding device, the numerals shown in Fig. 2 referring to inches of material fed.

To hold the adjustable stop 64 in any desired position, clamping means is provided in the form of a thumb nut 76 threaded on the outer end of the shaft 58 so that when this nut is tightened, it pulls the arm 64 firmly against the inner surface of the casing plate 54, and pushes the face plate 66 firmly against the outer surface of the casing plate 54, thus clamping the parts frictionally against rotation. Additional clamping means is preferably also provided in the form of a clamping member 78 overlying one edge of the face plate 66 and adapted to be clamped down tightly upon it by screwing down a nut 79 on a bolt 80 which is threaded into the casing 25, as shown in Fig. 5. A pin 81 fixed to the clamping member 78 and extending into a hole in the casing plate 54 prevents the member 78 from turning around the bolt 80 when the nut 79 is loosened. When the nut 76 and nut 79 are both tightened the face plate 66 is firmly gripped and held against rotation, thus holding the adjustable stop arm 64 stationary in the desired position to which it has been set, and limiting the range of movement of the metering member 57 which may then move from the position in which the projection 60 is against the fixed stop 61 (as in Fig. 3) to the position in which the projection 60 is against the adjustable stop 64 (as in Fig. 4), but no further.

The metering member 57 is preferably partially hollowed out, and within it there is a spiral spring 85, connected at one end to a pin 86 fixed to the casing, and at the other end to a pin 87 on the metering member. This spring exerts a constant tendency to turn the metering member in a counter-clockwise direction, when viewed as in Figs. 3 and 4, to a position in which the projection 60 is against the fixed stop 61, but it exerts only a little force which may be easily overcome by suitable operating means.

Since the driving member 40, which turns the shafts 26 and 28 is geared to the metering member 57 through the gear train 51, 52, 55, and 56, it is apparent that the driving member 40 may be turned only to the extent permitted by the metering member 57. If the metering member is initially in the position shown in Fig. 3 with the projection 60 against the stop 61, then the driving member 40 may be turned only until the projection 60 on the metering member has been brought around into contact with the adjustable stop or abutment 64 (as in Fig. 4) wherever this adjustable stop may, for the time being, be located, and when the projection 60 hits against the adjustable stop, further movement of the metering member in that direction is impossible, and hence further movement of the driving member 40 can not take place. In this way, the extent to which the feed rollers 19 and 20 will turn at each operation is limited and controlled by the extent of movement of the metering member 57. Then, the metering member may be allowed to return to its initial position under the influence of its spring 85, and during such movement, it turns the driving member 40 backwardly or in the opposite direction from the driving direction but, as already explained, this retrograde movement of the driving member 40 will not be transmitted to the shafts 26 and 28 because of the one-way roller clutch interposed between the driving member 40 and the shaft 26.

In order to operate the driving member 40, suitable operating means is provided, such as the crank handle 90 secured to a crank arm 91 fixed, as by a set screw 92, to a sleeve 93 which is both rotatable and movable longitudinally on the shaft 26. This sleeve 93 passes through the cover plate 54 of the casing and, at its inner end, carries an enlargement or flange 94 provided on its periphery with ratchet teeth 95 and also having annular clutch teeth 96 for engaging similar and cooperating clutch teeth 97 on the driving member 40. A spring 98 is coiled around the sleeve 93 within the casing and presses at its outer end upon the casing cover plate 54, and at its inner end against a washer 99, lying against the portion 94 of the sleeve, and thus tends to move the sleeve 93 constantly to its innermost position, in which the clutch teeth 96 on the sleeve are engaged with the clutch teeth 97 on the driving member 40. A slight outward pull on the crank arm 91 is sufficient, however, to overcome the force of the spring 98 and disengage the teeth 96 from the clutch teeth 97, such position of disengagement being illustrated in Fig. 5, while the engaged position of the parts is shown in Fig. 7.

A pawl 101 (Fig. 3) pivoted to the casing at 102 and pressed against the ratchet teeth 95 by a spring 103, permits the sleeve 93 to be rotated in a clockwise direction when viewed as in Figs. 2 and 3, but prevents it from being turned in a counter-clockwise direction. The width of the ratchet teeth 95 and the width of the face or effective edge of the pawl 101 are sufficiently great so that the pawl and the ratchet will always be engaged with each other irrespective of the longitudinal position to which the sleeve 93 may be shifted.

The operation of the device is as follows: The amount of material to be fed at each operation is decided upon, and the device is set for this extent of feeding by loosening the nuts 76 and 79, turning the face plate 66 to bring the index 71 opposite the desired graduation on the scale 70 and then tightening the nuts 76 and 79 again to clamp the parts in the desired position of adjustment for feeding the selected length of material. Ordinarily, of course, this setting occurs relatively infrequently, as the length of material once selected is usually fed over and over again many times before it is desired to change the setting to feed a different length of material. There is, of course, nothing to prevent a new setting of the feeding length after each separate feeding operation, if this should be desired under any special circumstances.

The parts having been set to meter the desired length of feeding, the crank 90 is then grasped and turned to the right or in a clockwise direction when viewed as in Figs. 1 and 2, as far as it will go. At this time, the clutch teeth 96 and 97 are in engagement with each other (being normally kept engaged by the spring 98) and the clockwise rotation of the crank 90 is transmitted to the driving member 40, which is rotated in a clockwise direction to the same extent. The clockwise rotation of the driving member 40 is transmitted through the roller clutch to the shafts 26 and 27 and the feed rollers 19 and 20, thus causing feeding of the sheet material 16. The rotation of the driving member 40 is also transmitted through the gear train 52, 55, and 56 to the metering member 57, and causes rotation of this metering member, swinging it around from its initial position shown in Fig. 3 in a clockwise direction until the projection 60 on the metering member comes into contact with the stop 64 which has been previously adjusted or set to the proper position.

As soon as the projection 60 thus contacts with the stop 64, further movement of the metering member 57 in a clockwise direction is impossible. Thus the driving member 40 can not turn any farther, and the rotation of the crank 90 is stopped, thus signifying to the operator who is turning the crank that the desired amount of sheet material has been fed, the amount thus fed being the amount indicated by the setting of the pointer 71 relatively to the scale 70 reading preferably directly in terms of inches of material to be fed. Now that the desired amount has been fed, the operator pulls outwardly for a moment on the crank arm 91, shifting the sleeve 93 outwardly from the engaged position shown in Figs. 6 and 7 to the disengaged position shown in Fig. 5. Because of the pawl 101 and ratchet teeth 95 it is impossible for the crank 90 to be turned in a counter-clockwise direction, but when this crank has been pulled outwardly to disengage the clutch teeth 96 and 97, then the spring 85 in the metering member 57 quickly returns the metering member from its operated position shown in Figs. 4 and 7 to its initial position shown in Figs. 3 and 5, where the projection 60 is engaged with the fixed stop 61. This counter-clockwise movement of the metering member causes counter-clockwise rotation of the driving member 40, but does not turn the feed rollers because the one-way roller clutch shown in Fig. 8 permits this counter-clockwise rotation of the driving member without corresponding movement of the shaft 26. When the parts have thus been returned to their initial position, which is signaled to the operator by the slight sound of the projection 60 hitting against the stop 61, the operator may then let go of the crank 91 and permit the spring 98 to move the sleeve 93 inwardly to engage the clutch teeth 96 and 97 with each other, ready for the next feeding operation. He may then, if desired, operate the knife 22 to cut off the exposed sheet material ready for developing and fixing and he may operate the camera to take another picture, after which another feeding and cutting operation takes place.

It will be observed that the amount of material to be fed at each operation may be adjusted to any desired extent within the range of the apparatus. The possibility of adjusting the device to feed any desired length of material is an important feature of this invention and a substantial improvement upon most of the prior devices of this kind, in which it has been necessary to adjust the feeding device to feed any one of a few selected or standard lengths of material. For example, in the device disclosed in United States Patent No. 1,053,068, to Schwab, granted February 11, 1913, the feeding may be adjusted only to those positions in which the plunger 42 enters one of the holes 41, which are spaced to conform to inches and half inches of feeding. It will be obvious that frequently it may be desired to feed other amounts of material rather than multiples of half inches, and this is not possible with the Schwab device. In the present construction, on the other hand, it is not necessary to place a pin or plunger in a hole, but the adjusting parts are clamped in any desired position by frictional clamping means, so that obviously they may be set to any desired position, irrespective of exact half inches or other exact fractions of an inch. No matter what odd fraction or amount of feed is desired, within the limits of the apparatus, the device may be set to this exact odd amount required. Thus, since there are no limits upon the number of positions to which the feeding mechanism may be set, it may be accurately said that this feeding mechanism may be set to any one of an infinite number of positions, or may be set to positions infinitesimally spaced from each other.

Another important respect in which the present apparatus is an improvement on and superior to prior apparatus as shown, for example, in said Schwab patent, is the fact that the present apparatus will accurately feed the exact amounts of material for which it is set, irrespective of the position in which the crank handle may have been left after the last preceding feeding operation, and irrespective of the spaces between various clutch teeth, and the like. In the present apparatus, the metering member 57 and the operating member 40 are connected to each other at all times and move together through corresponding amounts, and the operating member is connected to the feeding shafts 26 and 28 by means of a one-way roller clutch which transmits to the feeding shafts all movements of the operating member in one direction, no matter how small or how large these movements may be nor in what position the operating member is located when these movements start. In the prior construction illustrated in the Schwab patent, on the other hand, it is the crank 15 which turns the feeding shaft 10, and this crank is not connected to the metering member until the clutch parts 19 and 20 are engaged with each other. Consequently, if, at the beginning of the feeding operation, the clutch teeth 19 and 20 should be so arranged opposite each other that they would not mesh properly, it is apparent that some increment of rotation of the crank 15 will be required before the clutch parts 19 and 20 will mesh and before the crank will be connected to the metering member. To the extent of this preliminary increment of motion, the measuring of the length of material fed will be inaccurate. No such inaccuracies are possible with the present improved apparatus. In the present device, feeding of the material does not begin until the clutch teeth 96 and 97 are meshed with each other, and any preliminary motion of the crank prior to such meshing of the clutch teeth has no effect upon feeding the material. The connection of the metering member with the feeding shaft is wholly independent of the clutch teeth 96 and 97, so that improper engagement of these clutch parts can be of no moment in the accurate measuring and feeding of the material.

In fact, the accuracy of measuring and feeding of this present apparatus is so great that it is found in practice that successive pieces of sheet material are cut with sufficient uniformity to permit them to be placed in a card cabinet or the like, and used as a card catalogue or card index. It is known that very slight differences in width or height of adjacent cards in a card index, makes it difficult to separate the cards from each other with the finger tips in the usual manner. The height or width of all the cards used together in the same group or index should be uniform to within a very few thousandths of an inch. Such uniformity has never heretofore been possible with feeding and measuring apparatus of this same general type, but actual trial shows that the present apparatus does feed successive lengths which are uniform within a very few thousandths of an inch, so that the pieces severed after each feeding operation may be readily used without difficulty as a card index or catalogue, without any further trimming.

It is also now seen that the device of the present invention is particularly satisfactory and "foolproof", as there is practically nothing which an operator can do in a wrong way. If the operator attempts to pull the crank 91 outwardly as he turns it to feed the paper, this will simply disengage the clutch parts 96 and 97 so that no feeding will take place and no sheet material will be improperly fed or wasted. If the operator forgets, at the end of one feeding operation, to pull the crank outwardly in order to permit the metering gear to return to its initial position, he will simply find when he attempts the next feeding operation that he can not rotate the crank in either direction. Counter-clockwise rotation will be prevented by the pawl 101 and ratchet 95 while clockwise rotation will be prevented by the fact that the projection 60 on the metering member is already at the most clockwise limit of its rotation, in engagement with the adjustable stop 64. Thus, by his inability to move the crank, he will be reminded of his previous failure to pull the crank out and he will then pull the crank outwardly to release the clutch parts 96 and 97 for a moment and to permit the metering member 57 to return to its initial position under the influence of its spring 85. After this has been done, he may then proceed with the next feeding operation.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention or the scope of the appended claims.

I claim:

1. Feeding and measuring apparatus comprising a rotatable feeding shaft, a manually operable crank, disengageable means operatively connecting said crank to said shaft to drive said shaft when said crank is turned in one direction, a movable metering member, means for driving said member concomitantly with the driving of said shaft and through accurately corresponding extents of movement, adjustable stop means for limiting the extent of movement of said metering member and thereby limiting the extent of rotation of said feeding shaft, means for holding said stop means in any one of an infinite number of positions, means for preventing rotation of said crank in a reverse direction, and means for moving said metering member in a reverse direction when said crank connecting means is disengaged after said metering member has been driven by said crank.

2. Feeding and measuring apparatus comprising a rotatable feeding member, a movable metering member, means including a one-way roller clutch for interconnecting said two members to each other so that both members may be concomitantly driven together in one direction through accurately corresponding extents of movement, manual crank means for driving said members in one direction, adjustable stop means for limiting the extent of movement of said metering member and thereby limiting the extent of rotation of said feeding member and said crank means in one direction, said metering member being capable of movement in the opposite direction without corresponding movement of said feeding member, due to the interposition of said one-way roller clutch between said members, and resilient means tending to move said metering member in said opposite direction.

3. Feeding and measuring apparatus comprising a feeding member, a metering member having a limited range of movement, a driving member operatively connected to said metering member and constrained to move therewith, means including a one-way roller clutch operatively connecting said driving member to said feeding member, so that when said driving member moves in one direction to the extent permitted by the limited range of movement of said metering member, said feeding member will be moved to an accurately corresponding extent through said roller clutch, and so that when said driving member moves in the opposite direction, said feeding member need not move therewith, an operating member, means including a disengageable clutch for operatively connecting said operating member to said driving member to move said driving member by movement in one direction imparted to said operating member, means preventing movement of said operating member in a reverse direction, and resilient means tending to keep said last mentioned clutch in engaged position.

4. Feeding and measuring apparatus comprising a feeding member, a metering member having a limited range of movement, a driving member operatively connected to said metering member and constrained to move therewith, means including a one-way roller clutch operatively connecting said driving member to said feeding member, an operating member, means including a disengageable clutch for operatively connecting said operating member to move said driving member by movement imparted to said operating member, and resilient means tending to move said metering member toward one end of its limited range of movement, so that when said disengageable clutch is engaged and when movement is imparted to said operating member, said driving member will be moved to drive said metering member against the force of said resilient means to the extent permitted by said limited range of movement, and said feeding member will be driven through said roller clutch to an accurately corresponding extent, and when said disengageable clutch is disengaged at the end of said permitted range of movement, said resilient means will return said metering member and said driving member in a reverse direction without causing movement of said feeding member.

5. Feeding and measuring apparatus comprising a feeding member, a metering member having a limited range of movement, a driving member operatively connected to said metering member and constrained to move therewith, means including a one-way roller clutch operatively connecting said driving member to said feeding member, adjustable stop means for determining the extent of said limited range of movement of said metering member, friction clamping means for holding said adjustable stop means in any one of an infinite number of positions, an operating member, means including a disengageable clutch for operatively connecting said operating member to move said driving member by movement imparted to said operating member, and resilient means tending to move said metering member toward one end of its limited range of movement, so that when said disengageable clutch is engaged and when movement is imparted to said operating member, said driving member will be moved to drive said metering member against the force of said resilient means to the extent permitted by said limited range of movement, and said feeding member will be driven through said roller clutch to an accurately corresponding extent, and when said disengageable clutch is disengaged at the end of said permitted range of movement, said resilient means will return said metering member and said driving member in a reverse direction without causing movement of said feeding member.

6. Feeding and measuring apparatus comprising casing means, stationary lug means within said casing means, a shaft extending through a wall of said casing means from the exterior to the interior thereof, an arm fixed to said shaft within said casing means, a movable metering member within said casing means, said metering member including a part in alinement with said lug means and said arm for contact therewith to limit the extent of possible movement of said metering member, means externally of said casing means for turning said shaft to vary said extent of movement of said metering member, means for moving said metering member through its extent of movement in one direction, spring means constantly tending to turn said metering member in a reverse direction, a feeding member, and means interconnecting said metering member and said feeding member so that when said metering member is moved in one direction through its said extent of movement, said feeding member will be correspondingly moved by an equivalent amount.

7. Feeding and measuring apparatus comprising casing means, stationary lug means within said casing means, a shaft extending through a wall of said casing means from the exterior to the interior thereof, an arm fixed to said shaft within said casing means, a movable metering member within said casing means, said metering member including a part in alinement with said lug means and said arm for contact therewith to limit the extent of possible movement of said metering member, means externally of said casing means for turning said shaft to vary said extent of movement of said metering member, means for moving said metering member through its extent of movement in one direction, spring means constantly tending to turn said metering member in a reverse direction, a feeding member, and means including a one-way roller clutch interconnecting said metering member and said feeding member so that when said metering member is moved in one direction through its said extent of movement, said feeding member will be correspondingly moved by an equivalent amount, and when said metering member is moved in the opposite direction, said feeding member may remain stationary.

8. Feeding and measuring apparatus comprising casing means, stationary lug means within said casing means, a shaft extending through a wall of said casing means from the exterior to the interior thereof, an arm fixed to said shaft within said casing means, a metering member rotatably mounted on said shaft and including a part in alinement with said lug means and said arm for contact therewith to limit the extent of possible rotation of said metering member, spring means tending to move said metering member toward one end of its possible extent of movement, means externally of said casing means for turning said shaft to vary the possible extent of rotation of said metering member, means for moving said metering member through its possible extent of rotation in a direction opposing said spring means, a feeding member, and means including a one-way roller clutch interconnecting said metering member and said feeding member so that when said metering member is turned through said possible extent of rotation in a direction opposing said spring means, said feeding member will be correspondingly moved through an equivalent amount, and when said metering member is moved in the opposite direction by said spring means, said feeding member may remain stationary.

9. Feeding and measuring apparatus comprising casing means, stationary lug means within said casing means, a shaft extending through a wall of said casing means from the exterior to the interior thereof, an arm fixed to said shaft within said casing means, a metering member rotatably mounted on said shaft and including a part in alinement with said lug means and said arm for contact therewith to limit the extent of possible rotation of said metering member, spring means tending to move said metering member toward one end of its possible extent of movement, a plate non-rotatably secured to said shaft and lying externally of said casing means, means on said plate for turning said plate and shaft to move the position of said arm to vary the possible extent of rotation of said metering member, cooperating scale means on said plate and said casing means, means for clamping said plate against rotation relatively to said casing means to hold said arm in the position to which it is set, means for moving said metering member through its possible extent of rotation in a direction opposing said spring means, a feeding member, and means including a one-way clutch interconnecting said metering member and said feeding member so that when said metering member is turned through said possible extent of rotation in a direction opposing said spring means, said feeding member will be correspondingly moved through an equivalent amount, and when said metering member is moved in the opposite direction by said spring means, said feeding member may remain stationary.

10. Apparatus for measuring and feeding sensitized sheet material in a camera, comprising a pair of feed rollers for engaging opposite sides of said sensitized sheet material to feed it, a manually operable crank, means including a one-way roller clutch operatively connecting said crank to one of said feed rollers, a metering member having a limited extent of movement, means operatively connecting said metering member to said crank to limit the exent to which said crank may drive said one of said feed rollers, adjustable stop means for limiting the extent of movement of said metering member, means for holding said adjustable stop means in any one of an infinite number of positions infinitesimally spaced from each other, and spring means tending to move said metering member in one direction.

PAUL LANDROCK.